(12) United States Patent
Strub et al.

(10) Patent No.: US 7,194,186 B1
(45) Date of Patent: Mar. 20, 2007

(54) FLEXIBLE MARKING OF RECORDING DATA BY A RECORDING UNIT

(75) Inventors: Henry B. Strub, Lincolnwood, IL (US); David A. Burgess, Fairfield, CA (US); Kimberly H. Johnson, San Francisco, CA (US); Jonathan R. Cohen, San Francisco, CA (US)

(73) Assignee: Vulcan Patents LLC, Seattle, WA (US)

( * ) Notice: Subject to any disclaimer, the term of this patent is extended or adjusted under 35 U.S.C. 154(b) by 0 days.

(21) Appl. No.: 09/557,081

(22) Filed: Apr. 21, 2000

(51) Int. Cl.
   *H04N 5/91* (2006.01)
(52) U.S. Cl. .................. 386/46; 386/124; 360/72.1
(58) Field of Classification Search .................. 386/1, 386/6–8, 45, 68, 69–70, 81–82, 125–126, 386/46, 111, 112, 124; 360/72.1, 72.2, 72.3; 707/103 R, 104.1, 500.1, 100, 501.1; 345/723, 345/716, 719; 348/7, 13, 207, 211, 239, 348/333, 334, 569; 358/108, 342, 93, 188, 358/114, 117, 118, 120, 147, 165; 342/352, 342/357; 364/420, 449; H04N 5/76, 5/781, H04N 5/783, 9/79, 5/92
See application file for complete search history.

(56) References Cited

U.S. PATENT DOCUMENTS

| | | | | |
|---|---|---|---|---|
| 4,033,335 A | * | 7/1977 | Nikles | 600/436 |
| 4,524,381 A | * | 6/1985 | Konishi | 358/909.1 |
| 4,605,964 A | * | 8/1986 | Chard | 725/28 |
| 4,814,876 A | * | 3/1989 | Horio et al. | 358/906 |
| 5,012,335 A | | 4/1991 | Cohodar | 358/108 |
| 5,146,353 A | | 9/1992 | Isoguchi et al. | 358/909 |
| 5,179,449 A | * | 1/1993 | Doi | 386/4 |
| 5,267,042 A | * | 11/1993 | Tsuchiya et al. | 358/909.1 |
| 5,488,409 A | | 1/1996 | Yuen et al. | 348/5 |
| 5,583,571 A | | 12/1996 | Friedland | 348/373 |
| 5,594,498 A | | 1/1997 | Fraley | 348/158 |
| 5,604,551 A | | 2/1997 | Choi et al. | 396/58 |
| 5,613,032 A | * | 3/1997 | Cruz et al. | 386/69 |
| 5,713,021 A | * | 1/1998 | Kondo et al. | 345/723 |
| 5,717,814 A | * | 2/1998 | Abecassis | 386/46 |
| 5,726,660 A | * | 3/1998 | Purdy et al. | 342/357.1 |
| 5,742,339 A | | 4/1998 | Wakui | 348/233 |
| 5,818,510 A | * | 10/1998 | Cobbley et al. | 725/139 |
| 5,826,206 A | * | 10/1998 | Nemeth | 386/70 |
| 5,870,143 A | * | 2/1999 | Suzuki | 348/333.02 |
| 5,886,739 A | | 3/1999 | Winningstad | 348/158 |
| 5,940,004 A | | 8/1999 | Fulton | 340/825.49 |
| 5,982,979 A | * | 11/1999 | Omata et al. | 386/69 |

(Continued)

*Primary Examiner*—Thai Q. Tran
*Assistant Examiner*—Mishawn Dunn
(74) *Attorney, Agent, or Firm*—Perkins Coie LLP

(57) ABSTRACT

The invention enables a recorder to mark a recording as an event is being recorded. The invention can enable the specification of a mark so that the mark is associated with recording data obtained at a time other than the time at which the mark is specified ("non-contemporaneous marking"), i.e., prior to the time of the mark ("retrospective marking") or after the time of the mark ("predictive marking"). The invention can also enable the use of multiple types of marks, each type of mark having a particular meaning. Additionally, the invention can enable marking capability to be implemented so that specification of a mark causes predetermined operation of the recording unit in accordance with the type of the mark ("augmented marking").

41 Claims, 3 Drawing Sheets

U.S. PATENT DOCUMENTS

| | | | |
|---|---|---|---|
| 6,118,925 A * | 9/2000 | Murata et al. | 386/83 |
| 6,160,950 A * | 12/2000 | Shimazaki et al. | 386/95 |
| 6,243,725 B1 * | 6/2001 | Hempleman et al. | 707/530 |
| 6,282,362 B1 * | 8/2001 | Murphy et al. | 358/909.1 |
| 6,351,599 B1 * | 2/2002 | Komeno | 386/70 |
| 6,360,234 B2 * | 3/2002 | Jain et al. | 707/500.1 |
| 6,366,296 B1 * | 4/2002 | Boreczky et al. | 715/719 |
| 6,377,519 B1 * | 4/2002 | Lee et al. | 386/55 |
| 6,385,386 B1 * | 5/2002 | Aotake | 386/68 |
| 2002/0031331 A1 * | 3/2002 | Kwoh et al. | 386/46 |

* cited by examiner

FLEXIBLE MARKING OF RECORDING DATA BY A RECORDING UNIT

CROSS-REFERENCE TO RELATED APPLICATIONS

This application is related to the following commonly owned, co-pending United States Patent Applications, filed on the same date as the present application, the disclosures of which are incorporated by reference herein: "Low Attention Recording, with Particular Application to Social Recording," by Henry B. Strub et al., Ser. No. 09/408,481; "Hybrid Recording Unit Including Portable Video Recorder and Auxiliary Device," by Henry B. Strub et al., Ser. No. 09/408,284; and "Low Attention Recording Unit for Use by Vigorously Active Recorder," by Henry B. Strub et al., Ser. No. 09/408,482.

BACKGROUND OF THE INVENTION

1. Field of the Invention

This invention relates to using a recording unit to record an event and, in particular, to marking recording data as a recording is being obtained to enable subsequent identification of one or more parts of the recording that are associated with one or more marks.

2. Related Art

It is often desirable to record the content of an event (especially by obtaining an audio, a visual or an audiovisual recording of the event). For example, a person may desire to record an event (particularly one in which they participate) as a way of facilitating reminiscence of the event. Or, a person may desire to communicate the content of an event to one or more other people who were not present.

During recording of an event, it can be desirable to mark the recording. Some recording devices (e.g., some camcorders) can enable a mark of a single type to be associated with recording data at the time the recording data is obtained, the mark intended to indicate that the content represented by the recording data is of interest and may be particularly desirable to view during later display of the recording. The use of such a mark can enable the medium on which the recording data is stored to be searched to identify and display one or more parts of a recording in accordance with the location of mark(s) within the recording.

In a camcorder, marking is most easily implemented by storing marking data on the videotape onto which recording data is recorded. However, storing marking data on a videotape (or other linear data storage medium) has disadvantages. For example, searching for marks can take an undesirably long time, because the entire recording between a current location within the recording and a marked location within the recording must be traversed to reach the marked location. Additionally, for a similar reason, moving from a display of one marked part of a recording to another marked part of a recording can take an undesirably long time.

It is desirable to have greater flexibility in marking a recording. For example, it is desirable to be able to mark recording data of a recording other than the recording data being obtained at the time the mark is specified. This is particularly so since it may not be realized that it is desirable to mark a part of a recording until some time other than the time at which that part of the recording is being obtained. It is also desirable to be able to mark a recording with marks of different types, each type of mark having a different meaning. Such marking could be used to better facilitate searching and/or display of the recording by enabling increasing specificity in the identification of the content of parts of the recording. Further, it is desirable to store recording data and marking data on a non-linear data storage medium, since that enables faster searching for occurrence of a mark in a recording and also enables more flexible movement between different marked parts of a recording.

SUMMARY OF THE INVENTION

The invention enables a recording to be marked as an event is being recorded. Marking capability in accordance with the invention can be implemented in a variety of ways. A mark can be specified using a tactile control mechanism (which can be physically integrated with, or separate from, other components of the recording unit) adapted for that purpose or can be specified by a voice command. A mark can also be specified based upon analysis of audio recording data, visual recording data or both. A mark can also be specified, or an existing mark supplemented or modified, based on data other than recording data (e.g., physiological monitoring data, biometric data, position data) that is acquired by the recording unit.

In particular, the invention can enable the specification of a mark so that the mark is associated with recording data obtained at a time other than the time at which the mark is specified ("non-contemporaneous marking"), i.e., prior to the time of the mark ("retrospective marking") or after the time of the mark ("predictive marking"). The invention can also enable the use of multiple types of marks, each type of mark having a particular meaning. Additionally, the invention can enable marking capability to be implemented so that specification of a mark causes predetermined operation of the recording unit in accordance with the type of the mark ("augmented marking").

In one embodiment of the invention, a recording unit (which can be portable and, advantageously, wearable) includes: i) a data acquisition device for obtaining recording data (e.g., audio and/or visual recording data) representing the content of an event; ii) a data storage device for storing data, including recording data; iii) a control interface device enabling a recorder to control operation of the recoding unit, the control interface device including a marking mechanism for enabling the recorder to specify a non-contemporaneous mark (shown in 302 of FIG. 3); and iv) a system controller that causes, in response to the specification of a non-contemporaneous mark by the recorder, the data storage device to store marking data associating the non-contemporaneous mark with recording data obtained at a marked time different from the marking time at which the non-contemporaneous mark was specified by the recorder (shown in 304 of FIG. 3). The recording unit can be implemented to enable specification of retrospective marks and/or predictive marks. The marked time can be specified as an absolute time or as a time relative to the time at which the mark is specified. A confidence level that represents the certainty of the recorder that the marked recording data is the recording data that the recorder desires to mark can also be specified, either as part of the meaning of the specified mark or independent of the mark as a result of separate input by the recorder. The recorder can also indicate such certainty by specifying a range of time relative to the marked time within which it is believed that content of interest occurred.

In another embodiment of the invention, a method for use in a recording unit being used by a recorder to record an event includes the steps of: i) identifying the specification of a non-contemporaneous mark; and ii) in response to an identification of the specification of a non-contemporaneous mark, storing marking data associating the non-contemporaneous mark with recording data obtained at a marked time different from the marking time at which the non-contemporaneous mark was specified. As in the embodiment described above, the non-contemporaneous mark can be either a retrospective mark or a predictive mark, the marked time can be specified as an absolute time or as a time relative to the time at which the mark is specified, and a confidence level or range of times can be associated with the mark.

Non-contemporaneous marking is a particularly advantageous marking capability because it facilitates unobtrusive, low attention recording. It is expected that, typically, a recorder will desire to mark recording data representing content of particular interest. Yet it is also likely the case that such content will most engage the attention of the recorder at the time of recording. In other words, at the time that a recorder most wants to mark recording data, the recorder least wants to (or cannot) expend the attention required to operate a recording unit to effect such marking. Non-contemporaneous marking enables a recorder to devote attention to participating in an event at times when activity of most interest occurs, and specify a mark to be associated with that content at another time (either before or after) when the recorder's attention is not as engaged in participating in the event.

In yet another embodiment of the invention, a wearable portable recording unit includes: i) a data acquisition device for obtaining recording data (e.g., audio and/or visual recording data) representing the content of the event; ii) a data storage device for storing data, including recording data; iii) a control interface device for enabling a recorder to control operation of the recording unit, the control interface device including a marking mechanism for enabling the recorder to specify multiple types of marks; iv) a system controller that causes, in response to the specification of a mark by the recorder, the data storage device to store marking data associating the specified mark with particular recording data; and v) mechanism(s) for mounting one or more components of the recording unit on the body of the recorder. The recording unit can be implemented to enable the recorder to specify and/or change the meaning of one or more of the multiple types of marks. The recording unit can also be implemented to specify and/or change the meaning of one or more marks based on analysis of the recording data or on data other than recording data (e.g., physiological monitoring data, biometric data, position data) that is obtained by the recording unit. The recording unit can also be implemented to include one or more marking tokens for enabling a person to specify a corresponding type of mark, each marking token adapted to enable physical separation of the marking token from the recording unit. (This can enable specification of a mark by a person other than the person that controls acquisition of recording data by the recording unit; as can be appreciated, this also allows any one of multiple people to specify a mark at any time.) The multiple types of marks can include marks indicating a level of importance or interest of the content which the marked recording data represents. The multiple types of marks can include marks indicating a characteristic of the content which the marked recording data represents (e.g., the occurrence of conversation, a particular type of scene, a particular type of action). The multiple types of marks can include marks indicating the beginning or end of activity of interest. The multiple types of marks can include marks indicating the recording conditions (e.g., the quality of the ambient lighting, the ambient sound and/or the filming location). The multiple types of marks can include marks indicating the recorder's state of mind (e.g., different emotions, such as happiness, sadness, excitement or boredom, and, perhaps, the degree of those emotions). The multiple types of marks can include privacy marks (e.g., a mark that indicates that the marked part of the recording is personal, or a mark that specifies that the marked part of the recording is to be erased). The multiple types of marks can include marks identifying one of multiple recording units, perhaps, for example, to indicate which of the recording units recorded content of interest at a particular time. The multiple types of marks can include marks identifying the person making the mark.

A recording unit that can mark a recording with multiple types of marks can provide several advantages. For example, multiple marks can facilitate searching and/or display of a recording by increasing the specificity and richness with which the content of parts of the recording can be identified. Multiple marks can also facilitate remembrance of the content of a recording by a person reviewing the recording. Multiple marks can also enhance the content of a recording by providing additional information regarding the state of the recorder or the recorded event. Multiple marks can also facilitate post-event processing of a recording to, for example, enable editing of the recording, enhancement of the quality of the recording or restriction of access to parts of the recording. Multiple marks can also enable integration of multiple recordings obtained by multiple recording units. Providing the capability of marking a recording with multiple types of marks in a wearable recording unit makes the operation of such a recording unit (which can itself enhance the ability to record an event) even more flexible and robust.

Additionally, enabling a recorder to specify and/or change the meaning of one or more marks enhances the flexibility of the marking capabilities of a recording unit (in particular, a recorder can, before recording an event, define a set of marks that are particularly relevant to the expected content of the recording of that event). Further, the use of marking tokens can facilitate low attention recording by enabling specification of marks in a manner that requires as little attention from the recorder as possible.

In still another embodiment of the invention, a recording unit (which can be portable and, advantageously, wearable) includes: i) a data acquisition device for obtaining recording data (e.g., audio and/or visual recording data) representing the content of the event; ii) a data storage device for storing data, including recording data; iii) a control interface device for enabling a recorder to control operation of the recording unit, the control interface device including a marking mechanism for enabling the recorder to specify a mark; and iv) a system controller that causes, in response to the specification of a mark by the recorder, the data storage device to store marking data associating the specified mark with particular recording data, and operation of the recording unit in a predetermined manner in accordance with the type of the mark. For example, a mark that indicates a level of importance or interest of the content which the marked recording data represents can cause the recording data to be compressed in accordance with the level of importance or interest represented by the mark. This implementation of "augmented marking" can be desirable to enable improved use of limited capacity for storing recording data.

DETAILED DESCRIPTION OF THE INVENTION

Figure 1:
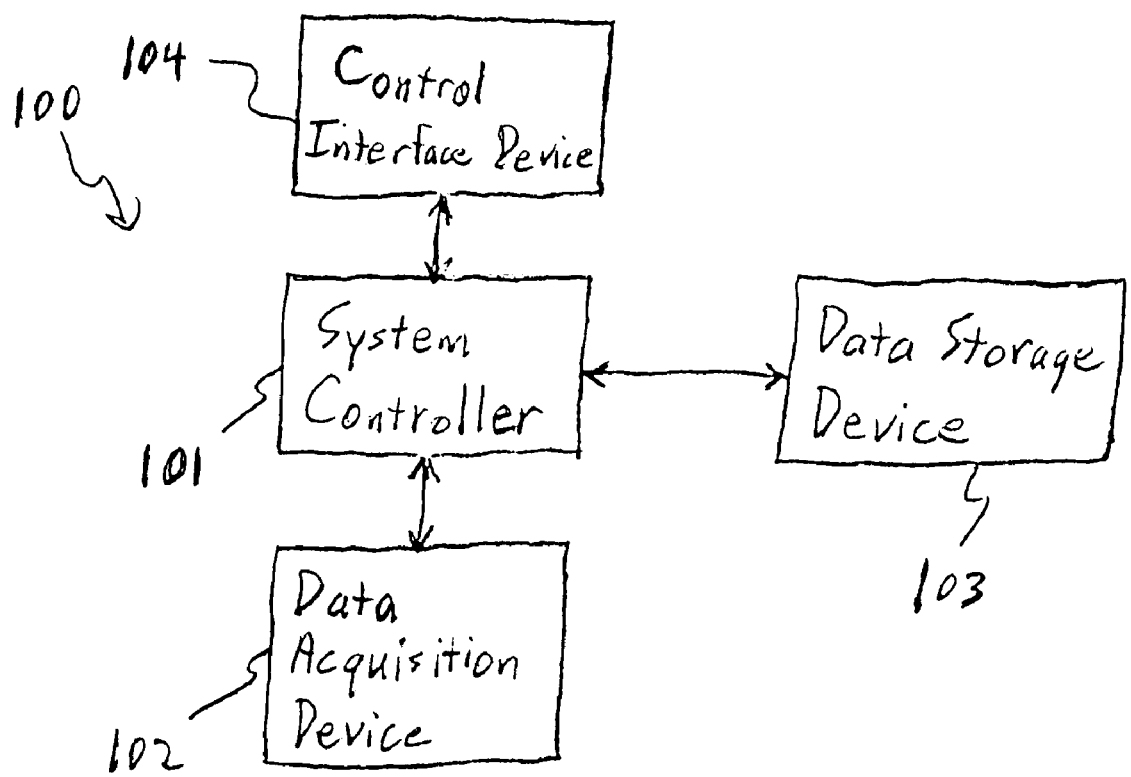
FIG. 1 is a block diagram illustrating the functional components of a recording unit in accordance with the invention.

The invention enables a recorder to mark a recording of an event as the recording is being obtained by a recording unit. ("Marking" is used herein broadly to indicate any annotation of a recording that is made in response to an action by the recorder intended to create such annotation. A "recorder" is a person having the capability of controlling a recording unit according to the invention.) The capability of marking a recording enables the recorder to augment a recording in a way that facilitates and/or enhances searching, display and/or processing of the recording, either during or after recording the event. As will be clear from the description below, marking capability in accordance with the invention can advantageously be implemented in a manner that affords the recorder flexibility in marking the recording. Additionally, marking capability in accordance with the invention can be implemented in a recording unit so as to facilitate "low attention recording" (i.e., recording that need not appreciably affect interaction of the recorder or others with the environment in which the recording is taking place). Low attention recording—and marking capability according to the invention—can be particularly advantageously employed in "social recording" (i.e., recording in which multiple participants in an event are recording the event).

There are many ways in which marking capability according to the invention can be implemented. For example, in some embodiments of the invention, as incidents of particular interest occur during the event being recorded, a dedicated marking mechanism can be used to specify a mark that is associated with the recording data being obtained at that time. (As described in more detail below, a mark may have a unique identification that, for example, identifies content in the marked part of the recording and/or the identity of the person who specified the mark.) Narrative description (either textual description entered via an appropriate input device or spoken description acquired by an appropriate audio data acquisition device) of an incident can be added to a recording as mark(s) or part(s) of mark(s). A mark can be specified using a tactile control mechanism adapted for that purpose. A mark can also be specified by voice commands. Advantageously, a recording unit according to the invention can enable the use of multiple types of marks, each type of mark having a particular meaning, thus providing flexible marking capability. A recording unit according to the invention can also advantageously enable the specification of a mark so that the mark is associated with recording data obtained at a time other than the time at which the mark is specified ("non-contemporaneous marking"). Non-contemporaneous marking can be implemented to enable the recorder to mark recording data obtained prior to the time of the mark ("retrospective marking") or subsequent to the time of the mark ("predictive marking"). Both retrospective and predictive marking are useful in enabling unobtrusive, low attention recording by the recording unit, as explained in more detail below.

FIG. 1 is a block diagram illustrating the functional components of a recording unit 100 in accordance with the invention. The recording unit 100 includes a system controller 101, a data acquisition device 102, a data storage device 103 and a control interface device 104. (In practice, each of the devices of the recording unit 100 can be embodied by a single apparatus or multiple physically distinct apparatus, and can also be embodied in such apparatus together with one or more of the other devices of the recording unit 100 and/or other devices that may be added to the recording unit 100.) The system controller 101 controls the operation of, and mediates interaction among, the other components of the recording unit 100. The system controller 101 can also operate to store information that identifies particular recording data in some manner (in particular, marking data that represents a mark specified by a recorder). The data acquisition device 102 acquires recording data representing the content of the event being recorded. The recording data acquired by the data acquisition device 102 is stored in the data storage device 103 for subsequent use (e.g., processing to, for example, manipulate the content of the recording; display of the recording; transmission to another recording unit). The data storage device 103 can also store other data (in particular, marking data). The control interface device 104 enables a recorder to control the operation of the recording unit 100 (in particular, to specify one or more marks as a recording is being obtained) and can also provide information to the recorder regarding the operation of the recording unit 100. A recording unit according to the invention can also include other devices not shown in FIG. 1; in particular, as discussed further below, a recording unit according to the invention can include one or more physiological monitoring devices, biometric devices, and/or position sensing devices.

The system controller 101 can be embodied by any device or devices, such as a microcontroller or other processing device, that can be operated to accomplish the functions of the system controller 101. The system controller 101 operates in accordance with appropriately specified instructions and/or data (e.g., computer programs) that are stored on a data storage device of the recording unit 100. The construction and operation of a system controller for use in a recording unit according to the invention can be implemented by those skilled in the art in view of the description herein of the functions of the system controller and of other components and aspects of the recording unit. Illustratively, a system controller for use in a recording unit according to the invention can be embodied by a Motorola 68HC11 microcontroller (as is commercially available) appropriately programmed, as can readily be done those skilled in the art, to accomplish the desired functions of the system controller.

The data acquisition device 102 can include device(s) for obtaining visual and/or audio recording data. Generally, any visual data acquisition device(s) (i.e., image capture device (s)) can be used in a recording unit according to the invention. It is anticipated that a device that acquires a continuous stream of visual data, such as a video camera, will be used in many applications of the invention. However, a still image camera can also be used. Further, either an analog visual data acquisition device (e.g., an analog video camera) or a digital visual data acquisition device (e.g., a digital video camera) can be used. Generally, any suitable audio data acquisition device(s) (e.g., one or more microphone) can be used in a recording unit according to the invention. Either analog or digital audio data acquisition devices can be used.

The data storage device 103 can be embodied by one or more devices. (It should be noted that each of the system controller 101, data acquisition device 102 and control interface device 104 can have one or more dedicated data storage devices associated therewith.) Any device(s) that are controllable by the system controller 101 can be used. Both digital and analog data storage devices can be used. The particular data storage device(s) used can depend upon the intended applications for the recording unit 100, as well as the characteristics of the other devices that are part of the recording unit 100. The data storage capacity of the data storage device is established primarily in view of the amount of recording data that it is desired to be able to store without replacing the data storage device or transferring data from the data storage device. (Storage of marking data will typically require very little data storage capacity and will therefore not appreciably affect the capacity of a data storage device to store recording data.) The recording unit 100 must include one or more non-volatile data storage devices, such as, for example, a hard disk (including both IDE and SCSI hard disks), videotape (either analog or digital), a removable data storage medium (such as a DVD disk that can be recorded on), and/or a solid-state memory device (such as flash memory). The recording unit 100 can also include one or more volatile data storage devices, such as, for example, a random access memory (RAM) that may be used to buffer data during recording. It is desirable that the data storage device on which recording data and marking data are to be stored be a non-linear data storage device, thereby enabling searching for the occurrence of a mark to be accomplished more quickly than would be the case if a linear data storage device was used and enabling quicker movement between different marked parts of a recording.

The control interface device 104 includes mechanisms for enabling a recorder to effect control of the operation of the recording unit 100 and can include mechanisms for displaying information to the recorder regarding the operation and/or state of the recording unit 100. The control interface device 104 also includes one or more mechanisms to enable a recorder to specify that a particular part of a recording be marked in some manner, i.e., that marking data be stored that is associated with and/or identifies particular recording data in some way.

The marking mechanism(s) of the control interface device 104 can be implemented using any of a variety of well-known mechanisms (e.g., one or more pushbuttons, switches or knobs, or a display of one or more menus), as known to those skilled in the art of constructing user interface devices. The particular marking mechanism used may be determined, or militated toward, by the particular marking capabilities provided, as can be appreciated from the further description of such capabilities below.

The invention can enable any of a variety of marking capabilities to be established, as described further below. Generally, each mark can be used to specify a time or duration of time during the recording and can have associated therewith a predetermined meaning.

In a simple implementation of marking capability, the control interface device 104 enables specification of a single type of mark, the mark indicating that a recorder considers the marked part of a recording to include content of particular interest. The marked part of the recording can be identified by the mark as the time during the recording at which the mark was specified. In other words, a recorder can mark content of interest at the moment the content is being recorded. The marking mechanism for such an implementation can simply be, for example, a pushbutton.

A mark enables quick location of recording content in the temporal vicinity of the part of the recording to which the mark refers. What constitutes "temporal vicinity" can be specified in any of a variety of ways. For example, a mark can be used to move to the exact time in a recording specified by the mark. Or, a mark can be used to move to a time in a recording that is a predetermined amount of time before or after the time specified by the mark. Or, a mark can be used to cause a segment of a recording to be displayed, the segment beginning at the time specified by the mark or at a time that is a predetermined amount of time before or after the time specified by the mark, and ending at the time specified by the mark or at a time that is a predetermined amount of time before or after the time specified by the mark (e.g., the segment begins 5 seconds before the time specified by the mark and ends 5 seconds after that time). The temporal vicinity of a mark can be specified as part of the post-event processing and display of the recording. The temporal vicinity of a mark can also be defined as the meaning or part of the meaning of a mark.

The invention can be implemented to enable a recorder to mark a part of a recording other than the part being obtained at the time the recorder specifies the mark. In particular, it is anticipated that it will be useful to enable a recorder to specify a mark that is associated with a part of a recording previously obtained (i.e., to mark the recording with a retrospective mark). This can be particularly useful in facilitating low attention recording, since a recorder may be so immersed in participating in an event that the recorder does not realize until some time after activity of interest has occurred (perhaps hours or days after) that it is desirable to mark the recording of that activity. Retrospective marking can be implemented, for example, by enabling a recorder to specify a particular time (i.e., absolute time). Retrospective marking can also be implemented by enabling a recorder to specify a duration of time (i.e., relative time), the time prior to, by the amount of the duration of time, the time at which the retrospective mark is specified being the time associated with the mark. For retrospective marking, the marking mechanism can again be implemented, for example, by pushbuttons: one button can be used to indicate that a retrospective mark is being specified, while other buttons (e.g., a numeric keypad) can be used to specify the amount of time prior to the present which the mark is to designate. (However, other marking mechanisms can also be used, such as a display of one or more menus.) Retrospective marking can also be implemented to enable specification, with a retrospective mark, of a range of prior times (e.g., within 1 minute of the time that is 10 minutes prior to the current time), a confidence level together with a prior time (e.g., a 50% certainty that the content of interest occurred 20 minutes ago), or both a range of prior times and a confidence level. Further, the magnitude of the range of times and/or the confidence level can be made dependent (perhaps automatically) upon the "recency" of the mark (i.e., the proximity of the marked time to the marking time at which the mark is specified). For example, as the duration of time between the marked time and the marking time increases, the confidence level typically decreases. Additionally, as the duration of time between the marked time and the marking time increases, the importance of the use of other data (e.g., physiological monitoring data, position data) in aiding the identification of the actual recording data that corresponds to a mark increases, and vice versa.

Similar to retrospective marking, the invention can be implemented to enable a recorder to specify predictive marks, i.e., to mark a part of the recording that will be obtained in the future. Like retrospective marking, predictive marking can facilitate low attention recording, since a recorder can mark anticipated activity of interest prior to the activity (at a presumably less interesting time), thus freeing the recorder for participation in that activity without having to be concerned about remembering to mark the recording of the activity. Predictive marking can be implemented in ways similar to retrospective marking, e.g., by specifying a particular time in the future (absolute time) or by specifying an amount of time from the present (relative time). Likewise, similar marking mechanisms can be used. And, as with retrospective marking, predictive marking can be implemented to enable specification of, with the predictive mark, a range of future times and/or a confidence level.

The control interface device 104 can be implemented so as to enable specification of multiple types of marks, each mark having a different meaning. A marking mechanism can be provided for each type of mark (e.g., multiple pushbuttons, one corresponding to each type of mark) or each type of mark can be specified by a sequence of marking mechanism activations (e.g., pressing a sequence of pushbuttons). A joystick or wheel can also be implemented to enable specification of different marks in accordance with corresponding movement of the joystick or wheel (this can be particularly useful when the marks reflect different degrees of some quantity or quality). One or more menu displays can also be used to enable specification of different types of marks. In particular, such marking can be implemented so that the recorder is offered the opportunity to make a mark increasingly specific: an initial mark brings up a menu display which allows the recorder either to accept the current marking definition or select a more specific marking definition, selection of a more specific marking definition brings up a menu display which allows the recorder either to accept the current marking definition or select an even more specific marking definition, etc. (any desired number of levels of such nesting can be used, though as a practical matter, it may be desirable to have no more than one, two or three levels of increasing mark specificity).

As indicated above, the temporal vicinity of a mark can be defined as the meaning or part of the meaning of a mark. When the control interface device 104 allows multiple marks, different marks can have a different temporal vicinity associated therewith. For example, one or more marks can specify marking of the data currently being recorded, while other marks can specify marking of data obtained a predetermined amount of time before or after the time of specification of the mark.

Multiple marks can also be used to assign differing levels of importance or interest to the marked content. For example, one mark could indicate that the marked content is extremely important or interesting, another mark that the marked content is very important or interesting, and a third mark that the marked content is moderately important or interesting. One or more marks could also be used to indicate that the marked data is uninteresting or unimportant, so that the parts of the recording corresponding to such marks could be skipped during later playback of the recording.

Multiple marks can also be used to indicate a characteristic of the content which the marked data represents. For example, one mark could be used to indicate that the content represented by the marked recording data includes conversation, while another mark could be used to indicate that the content represented by the marked recording data includes a particular type of scene, while still another mark could be used to indicate that the content represented by the marked recording data includes a particular type of action.

Multiple marks can also be used to indicate the beginning and end of activity of interest during an event. As an illustration of the use of such marks, during a recording of a birthday party, a recorder could specify a "start" mark when a birthday cake is being brought out and an "end" mark when the singing of "Happy Birthday" has been completed. Additional marks can also indicate a characteristic of the content of the marked activity of interest, as discussed above.

Multiple marks can also be used to specify information regarding the recording conditions. For example, different marks could be used to indicate the quality of the ambient lighting, ambient sound and/or filming location. Different marks could also be used to indicate whether noise is present in the audio recording or, further, the amount of noise present in the audio recording.

Multiple marks can also be used to specify a recorder's state of mind during the recording. For example, different marks could be used to indicate different emotions (e.g., happiness, sadness, excitement, boredom)—and, perhaps, the degree of those emotions—experienced by the recorder during the recording. Physiological data that can be acquired by a recording unit according to the invention, as discussed elsewhere herein, can also be used to implement marks of this type, the physiological data being analyzed to infer emotion(s) of the recorder.

It can also be desirable to enable specification of one or more privacy marks, in addition to the other types of marks described above. (Herein, "privacy mark" refers to a mark that either restricts, prohibits or eliminates the possibility of access to the marked part of the recording, or indicates that it is desired to restrict, prohibit or eliminate the possibility of access to the marked part of the recording.) For example, one type of privacy mark could indicate that the marked part of the recording is personal. Such a mark may be used by a recorder to, for example, indicate that the recorder may want to take appropriate steps after the event to inhibit the observation of that part of the recording by others. Another type of mark could indicate that the marked part of the recording is to be erased. Such a mark may be used by a recorder to, depending upon the particular implementation of the recording unit, cause the marked part of the recording to be erased during the event or indicate that the marked part of the recording is to be erased after the event.

When an event is being recorded by multiple recording units, multiple marks can also be used to identify which of the multiple recording units is known or thought to have recorded content of particular interest. As one illustration of the use of such marks, two recorders may be using recording units to record content at different locations. (This marking capability may be particularly useful when the recorders are at locations from which the recorders cannot make visual contact.) The recording units are implemented to enable the recorders and/or the recording units to communicate with each other during recording so that each recorder is aware of the nature of the content being recorded by the recording unit of the other recorder. One of the recorders may decide, based upon such communication, that some or all (audio recording, visual recording or both) of the recording content being obtained by the recording unit of the other recorder is of particular interest, and specify a mark that so identifies that recording unit. (The marking capability may be further implemented to enable more specific identification of the recording content of interest, e.g., audio recording or visual recording.)

Multiple marks can also be used to identify the person making the mark. For example, as described further below, a marking token that can be physically separated from the control interface device of a recording unit according to the invention can be used to specify one or more marks. In particular, such a marking token can be adapted to enable wireless communication with the remainder of the recording unit, thereby enabling the marking token to be given to a person who possesses and controls only the marking token. Such use of a marking token can enable multiple people to specify marks for the recording obtained by a single recording unit. Similarly, if the recording unit is adapted to enable communication with other recording units, it can be possible for those other recording units to communicate marks to the recording unit. Such marks are specified by persons other than those operating the recording unit by which the marks will be stored. In either case, it can be useful for a mark to indicate the identity of the person specifying the mark.

Multiple marks can also be used to identify a person present in the content represented by the marked visual recording data. For example, it can be desirable to specify a set of marks where each mark corresponds to one of some or all of the people participating in an event. Or, depending upon the nature of the event, it may be desirable to specify a set of marks where each mark identifies a person having a particular characteristic, i.e., a person belonging to a pre-defined group (e.g., during a sports event, different marks can be used to identify members of different teams participating in the event).

It can be particularly desirable to implement marking capabilities according to the invention so that the meaning of the marks available to a recorder can be varied (i.e., the meaning associated with the activation of a particular marking mechanism or series of marking mechanism activations can be changed). Such variable mark meaning can enable a recorder to specify particular desired mark meanings, prior to recording an event, that are related to the event which is being recorded. For example, different marks could be defined to correspond to particular people that will participate in the event, so that activity or conversation by those persons during the event can be denoted. Or, different marks could be defined to designate particular occurrences during the event. For example, if the event is a birdwatching expedition, different marks could denote the sighting of particular types of birds.

Varying the meaning of marks can be accomplished, for example, by providing such capability as part of a recording unit docking station (an apparatus separate from the recording unit) which is adapted to enable a user to transfer desired instructions and/or data (including data representing one or more marking definitions) to the data storage device(s) of a recording unit to effect particular operation of the recording unit. The docking station can include an interface which enables a user to specify desired marking definitions. Such a docking station can also be implemented so that the docking station can be connected to a network (e.g., a computer network such as the Internet) to enable marking definitions to be transferred to the recording unit from another network location via the docking station. A recording unit according to the invention can also be implemented so that one of multiple plug-in modules, each plug-in module including a data storage device (e.g., an EEPROM) having stored thereon one or more sets of marking definitions, can be engaged with the recording unit. For example, a theme park may provide multiple such plug-in modules, each module including marking definitions for one or more attractions at the theme park.

A recording unit according to the invention can also be implemented so that the meaning of marks can be varied during recording of an event. Multiple sets of marking definitions can be stored on data storage device(s) of the recording unit, together with instructions regarding selection of a particular set of marking instructions in response either to particular user input or to content of data (recording data by the data acquisition device(s) or data obtained by other device(s), such as a physiological monitoring device, biometric device or position sensing device) obtained by the recording unit. For example, the available types of marks can vary with the position of the recording unit. The recording unit can also be implemented so that the available types of marks vary over time during recording.

Marking capability ("augmented marking") according to the invention can be implemented so that the specification of a mark causes operation of the recording unit in addition to the storage of the meaning and the time associated with the mark. For example, specifying a mark that indicates that particular content is of little or no interest can cause the recording unit to compress the recording data acquired by the recording unit by a predefined amount that is greater than the amount of compression (if any) that occurs during normal operation of the recording unit. Similarly, if multiple marks can be specified indicating varying levels of interest, each such mark can cause the recording data to be compressed by a particular predefined amount, e.g., as the mark indicates relatively less interest, the compression ratio increases, and as the mark indicates relatively greater interest, the compression ratio decreases. To facilitate low attention recording, such marking capability can be implemented so that the compression in accordance with the mark ends after a predetermined amount of time (e.g., some amount of time less than about a minute), thus freeing the recorder from continually monitoring operation of the recording unit to ensure that normal compression (again, if any) resumes when content of interest is again being recorded. Alternatively, such marking capability can be implemented so that compression in accordance with the mark continues until an instruction (such as a mark indicating content of interest) is specified by the recorder that causes such compression to stop. A recording unit according to the invention can also be implemented so that locations of a data storage device at which recording data is stored that represents content marked as being of no interest can be re-used to store newly acquired recording data.

To facilitate the implementation of marking—in particular, to enable specification of marks in a manner that requires as little attention from the recorder as possible—marking apparatus (a "marking token") can be provided that can be physically separated from the rest of a recording unit according to the invention. For example, a ring, brooch, bracelet (e.g., a watch-like band) or similar wearable item can be constructed with one or more pushbuttons and adapted to enable communication (perhaps wirelessly) with the remainder of the recording unit. The recorder can then specify a mark by (almost reflexively) simply reaching for the marking token and depressing a pushbutton. Each marking token can be adapted to enable specification of one or more marks; however, it may be desirable, to facilitate low attention recording, for each marking token to be confined to specification of a single type of mark, in order to minimize the amount of attention that the recorder must devote to use of the marking token. A marking token can be constructed (e.g., can have a shape and/or color) so that the type of mark or marks which the marking token can be used to specify can be readily identified, further facilitating low attention recording. A recording unit according to the invention can include multiple marking tokens. A marking token that is adapted to enable wireless communication with the remainder of the recording unit can be given to a person who possesses and controls only that part (the marking token) of the recording unit, thereby enabling that person to specify marks during or after recording (either in addition to, or instead of, the person operating the remainder of the recording unit).

A marking token can also be implemented to enable storage of marking data thereon (i.e., can include a non-volatile data storage device), such a marking token further including a real-time clock that enables a correspondence between the marking data and the recording data stored by the recording unit to be established. This can advantageously enable a recorder to carry around the relatively small and simple marking token without need to carry an entire recording unit, thus facilitating the ability of the recorder to make marks at any time (e.g., hours or days after recording an event). When the marking data is stored on the marking token, the marking token is constructed with a communications port that enables the marking data to transferred from the marking token. Further, when the marking data is stored on the marking token instead of with the recording data, temporal synchronization of marks with recording data can be enabled in the manner described below by including an LED and a real-time clock (RTC) as part of the marking token. The marking token can be constructed so that, during operation of the recording unit, the marking token can be operated (e.g., a button can be depressed for more than a predetermined duration of time) to cause the LED to flash, the marking token being held in a position that enables the visual data acquisition device to film the flashing LED. The above-described synchronization is performed each time that recording begins again after having been stopped.

A recording unit according to the invention can be implemented to enable a mark to be specified by a voice command ("voice marking"). Microphones that are also used to acquire audio recording data can be used for voice marking, for example.

In one implementation of voice marking, the recorder simply states during recording that particular recorded content is to be identified in a particular way. This mark can be used during later review of the recording.

In another implementation of voice marking, during recording the recorder speaks one or more of a particular set of "marking words" that are recognized by the recording unit and used to generate appropriate marking data. To enable such voice marking, a mechanism for indicating that a voice mark is to be imminently specified is employed to enable a voice mark to be understood (i.e., distinguished from audio recording data). Such mechanism can be, for example, a mechanical control (e.g., pushbutton or switch) or a recognizable speech pattern or sound (e.g., a predetermined word or sequence of words). The identification of the spoken mark can then be determined using voice recognition techniques to analyze the speech occurring after the indication of an impending mark (e.g., within a predetermined short duration of time after such indication), as known to those skilled in the art.

The recording data can be analyzed to produce a mark or to supplement or modify an existing mark. A mark can be produced based on analysis of audio recording data, visual recording data, or both.

For example, the audio recording data can be analyzed to determine if speech is present and, if so, the identity of the speaker. (Such analysis can be facilitated by identifying a set of possible speakers before beginning recording.) Recording data including speech can then be marked with the identity of the speaker or speakers. Or, the audio recording data can be analyzed to detect emphasis, cadence or other characteristics of speech present in the audio recording data. This can be accomplished by, for example, analyzing the stress and/or timing of audio data within a set of audio recording data representing the speech. The characteristics of the speech can then be used to produce, for example, marks indicating a probable level of interest of the recorded content (e.g., speech uttered rapidly or with a relatively large amount of stress tends to indicated excitement on the part of the speaker; the recording data obtained at that time may therefore be marked as probably representing content having a high level of interest). Techniques for accomplishing the above-indicated types of audio data analysis are known to those skilled in the art. For example, such techniques are described in "The use of emphasis to automatically summarize a spoken discourse," by F. R. Chen et al., 1992 IEEE International Conference on Acoustics, Speech and Signal Processing, vol. 1, pp. 229–232, San Francisco, 1992; "Construction and Evaluation of a Robust Multifeature Speech/Music Discriminator," by Eric Scheirer et al., Proceeding of the 1998 International Conference on Acoustics, Speech, and Signal Processing, Munich, 1997; "Baby Ears: A Recognition System for Affective Vocalizations," by Malcolm Slaney et al., Proceeding of the 1998 International Conference on Acoustics, Speech, and Signal Processing, Seattle, 1998; and *Advances in Speech Signal Processing*, edited by Sadaoki Furui and M. Mohan Sondhi, Chapter 22, pp. 701–738, 1992, the disclosures of which are incorporated by reference herein. Techniques for accomplishing such audio data analysis are also described in the commonly owned, co-pending U.S. patent application Ser. No. 09/239,455, entitled "Variable Rate Video Playback with Synchronized Audio," by Neal A. Bhadkamkar et al., filed on Jan. 28, 1999, the disclosure of which is incorporated by reference herein.

The visual recording data can be analyzed to identify colors, textures (i.e., gradations in visual pattern) and/or shapes which can, in turn, be used to identify objects in the visual recording content. The corresponding recording data can then be marked with a mark appropriate to the visual recording content. For example, analysis of the visual recording data may indicate the presence of particular scenery (e.g., a body of water, a tree); a corresponding mark can be used to indicate the presence of that scenery in the recording data. Or, for example, the visual recording data can be analyzed to identify the presence of a person in the visual recording content and, if a person is present, the visual recording data can further be analyzed to identify the person based on facial or other features. Techniques for accomplishing the above-indicated types of visual data analysis are known to those skilled in the art. For example, such techniques are described in "Searching for Digital Pictures," by David Forsyth et al., Scientific American, June 1997; *Face RecoQnition: From Theorv to Applications*, edited by Harry Wechsler et al., pp. 244–261, 1998; "Face and feature finding for a face recognition system," by Andrew W. Senior, Proceedings of the Second International Conference on Audio- and Video-based Biometric Person Authentication, Washington, D.C., 1999; and "Multi-Sensor Biometric Person Recognition in an Access Control System," by Bernhard Froba et al., Proceedings of the Second International Conference on Audio- and Video-based Biometric Person Authentication, Washington, D.C., 1999, the disclosures of which are incorporated by reference herein.

A recording unit according to the invention can be implemented to enable acquisition of data other than recording data or marking data as discussed above. In particular, the recording unit can be implemented so that such data can be used to supplement or modify another mark in some way, or so that such data can be used as a mark itself. For example, a recording unit according to the invention can include one or more physiological monitoring devices that obtain data regarding a physical characteristic of the recorder, one or more biometric devices, and/or one or more position sensing devices, each of which can acquire data that can be used in the above-described way. Since a non-contemporaneous mark will typically be specified with some degree of uncertainty, such data can advantageously be used, in particular, to assist in the accurate identification of recording content intended to correspond to a non-contemporaneous mark. Further, the importance of using such data for this purpose increases with the distance in time between the marked time and the marking time at which the mark is specified.

Generally, any physiological monitoring device can be included in a recording unit according to the invention. For example, a physiological monitoring device can be used to monitor, preferably on an ongoing basis, physical characteristics of a recorder, such as, for example, heart rate, galvanic skin response, EEG, ECG, body temperature, respiration rate and/or volume, blood oxygen level and/or level of $CO_2$ in exhaled breath, that can be used to infer information regarding the recorder's physical and/or mental state during recording. A recording unit according to the invention can include multiple physiological monitoring devices, i.e., more than one of a particular type of physiological monitoring device (e.g., multiple EMG devices) and/or multiple different types of physiological monitoring devices). Further, measurements from multiple physiological monitoring devices can be compared, combined or otherwise analyzed together to enable or facilitate inference of information regarding the recorder based on the physiological measurements.

Similarly, any type of biometric device can be included in a recording unit according to the invention, such as, for example, a fingerprint scanning device, retinal scanning device and/or faceprint scanning devices. A recording unit according to the invention can include multiple biometric devices. A biometric device can be useful to identify a recorder to, for example, enable identification of marks made by that recorder.

Generally, any position sensing device can be included in a recording unit according to the invention. (The "position" of a recording unit includes the location of the recording unit—which can be specified in global, local or relative coordinates—and/or the orientation of the recording unit—which can be defined, for example, with respect to the filming orientation of the visual data acquisition device, or a part of the recording unit or the recorder's body.) For example, a recording unit according to the invention can include a global positioning system (GPS) receiver, a receiver or transmitter that can communicate with corresponding transmitters or receivers of a local positioning system or other recording units, an electronic compass, an inertial reference system using one or more gyroscopes and/or a tilt sensor. The recording unit can include multiple position sensing devices.

A physiological monitoring, biometric or position sensing device for use in a recording unit according to the invention can be implemented so that the recorder must initiate operation of the device (i.e., acquisition of physiological, biometric or position data). Alternatively, the physiological monitoring, biometric or position sensing device can be implemented so that the device operates automatically, acquiring data whenever the recording unit is powered on or recording (and, if applicable to the particular device, when the device detects the presence of an input to the device's sensor(s)).

As indicated above, data such as physiological monitoring data, biometric data and position data can be used to supplement or modify another mark in some way, or can be used as a mark itself. For example, physiological monitoring of one or more of the above-mentioned physical characteristics can enable the recorder's emotional state to be inferred (e.g., when the recorder is excited or bored). Corresponding recording data can be marked with a mark that indicates the recorder's emotional state (e.g., when excitement is sensed, an indication of excitement and, perhaps, the level of excitement). (It may also be desirable to simply store and/or display such physiological data.) Or, corresponding recording data can be marked with a mark that indicates a level of importance or interest (inferred from the recorder's emotional state) of the marked part of the recording. Additionally, such a mark (or the information represented by the mark) can be used together with another mark to enhance the identification of the marked recording data. For example, physiological monitoring data can be used with retrospective and predictive marks (discussed elsewhere herein) to facilitate determination of whether recording data associated with a retrospective or predictive mark in fact represents content of interest (e.g., recording data temporally proximate to the recording data designated by the mark can be searched to identify recording data obtained while the recorder was experiencing a particular emotional state, such as excitement or fear) Further, physiological monitoring data can be used together with a confidence level and/or time range (discussed above) associated with a mark to facilitate determination of whether recording data associated with a retrospective or predictive mark in fact represents content of interest. Physiological monitoring data can also be used to define, or modify a previous definition of, the temporal vicinity of a mark (discussed above). In any case, the physiological monitoring data can be used to enable identification of parts of a recording that have a relatively high probability of being interesting or uninteresting. This can be particularly useful when a large amount of recording data has been obtained, since there may only be a relatively small amount of the recording data that is of real interest.

Position data can also be used separately as a mark, identifying the location and/or orientation of the recording unit at the time that corresponding recording data was obtained. This can enable, for example, ready identification of recording data obtained at or near a particular location. Position data can also be used to supplement or modify other marks. For example, position data can be used with retrospective and predictive marks (and, if appropriate, confidence levels and/or time ranges associated with the retrospective and predictive marks) to facilitate determination of whether recording data associated with a retrospective or predictive mark in fact represents content of interest (e.g., recording data temporally proximate to the recording data designated by the mark can be searched—in accordance with a specified confidence level or time range, if appropriate—to identify recording data obtained at or near a specified position at which it is known that the content of interest was obtained). Position data can also be used to define, or modify a previous definition of, the temporal vicinity of a mark (discussed above). Additionally, position data can be used to vary the meaning of one or more marks. For example, one set of marks (e.g., marks identifying particular people or events) can be used so long as the recording unit is within a first defined region and a different set of marks (e.g., marks identifying different particular people or events) can be used when the recording unit is within a second defined region. Position data can also be used to determine related derivative information, such as, for example, a path of movement of the recording unit or the velocity at which the recording unit is moving, that can also be used as a mark or to supplement or modify another mark.

As indicated above, physiological, position and/or other data can be used to supplement or modify another mark in some way. In particular, such data can be used to assist in the accurate identification of recording content intended to correspond to a non-contemporaneous mark. The importance of using such data for this purpose increases with the distance in time between the marked time and the marking time at which the mark is specified.

Figure 2:
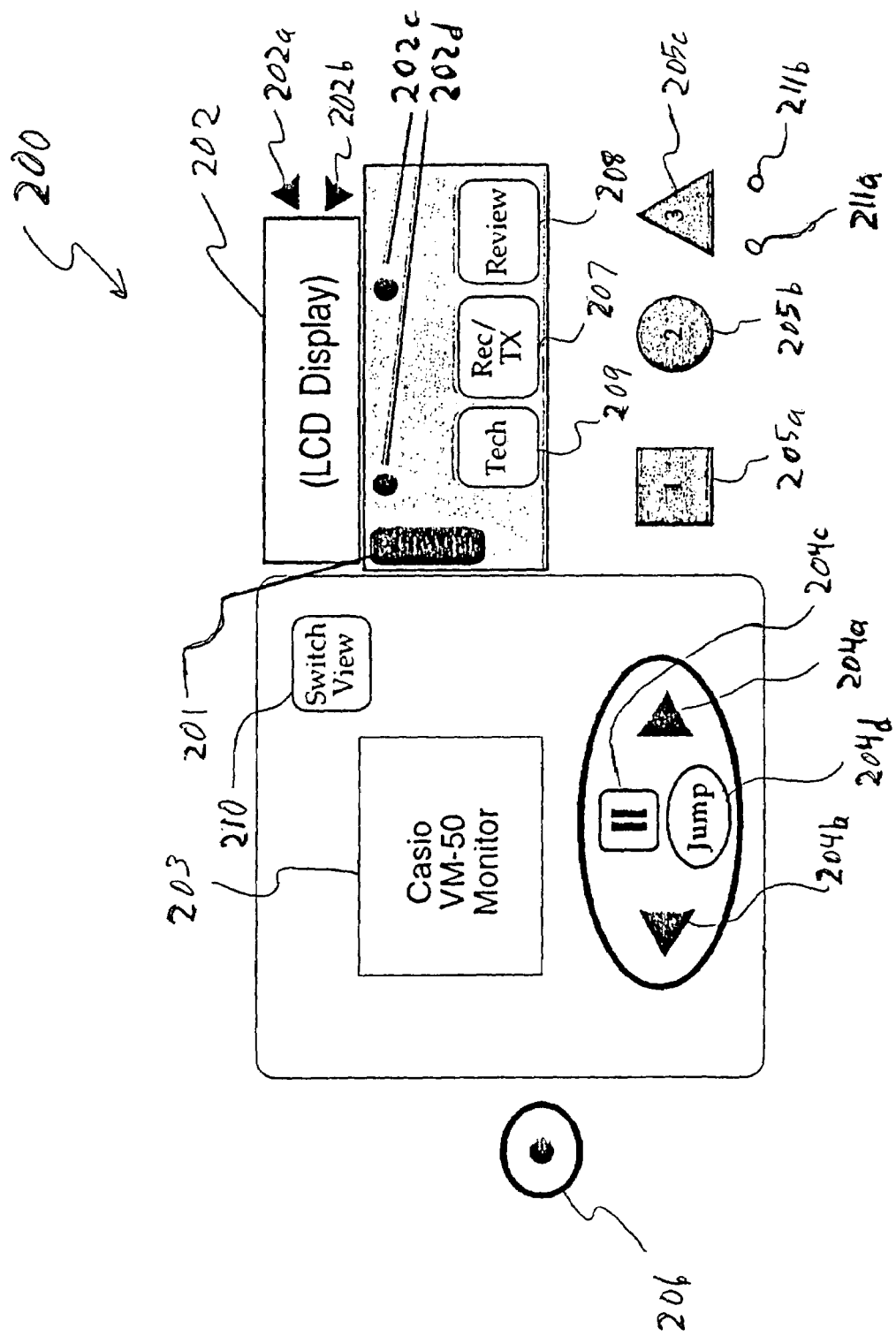
FIG. 2 illustrates a control interface device according to an embodiment of the invention.
Figure 3:
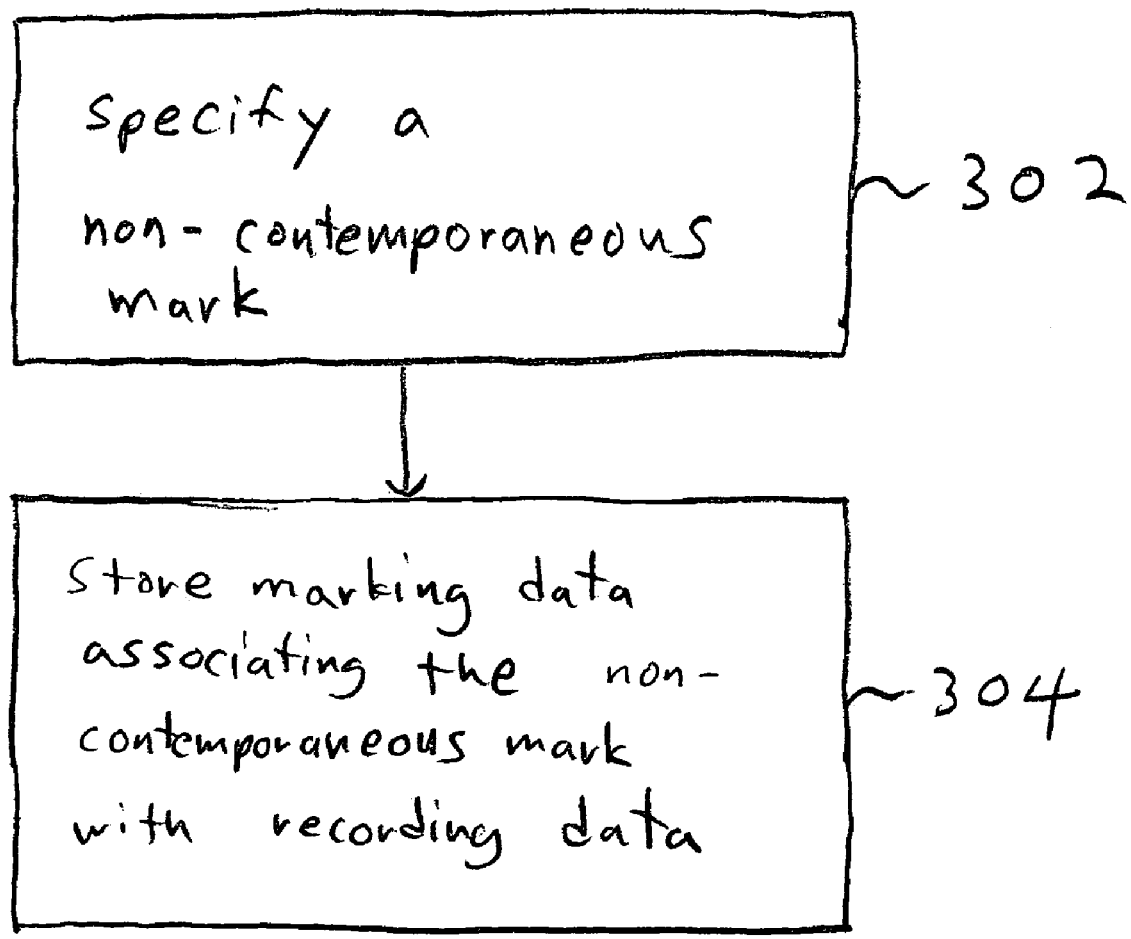
FIG. 3 is a flowchart illustrating an embodiment of a process for non-contemporaneously marking recording data obtained by a recording unit.

FIG. 2 illustrates a control interface device 200 that can be used to effect marking capability according to the invention for a recording unit of which the control interface device 200 is part.

A power button 201 is used to turn power to the recording unit components off and on.

A control interface visual display 202 enables display of information to the recorder, such as information regarding control and operation of the associated recording unit. In particular, the control interface visual display 202 can display information enabling the recorder to specify a mark, as discussed further below. The control interface visual display 202 can be, for example, a two-line, 12 character LCD display. The buttons 202a and 202b enable the recorder to scroll through the control interface visual display 202. The buttons 202c and 202d enable the recorder to select one of two displayed control options: the buttons 202c and 202d are positioned to underlie corresponding control options displayed on the control interface visual display 202.

A visual recording display 203 enables display of a recording to the recorder. In response to appropriate instruction from the recorder, as described further below, the visual recording display 203 can display the content currently being recorded by the recording unit or a part of a recording that has previously been recorded (perhaps identified using a previously specified mark). The visual recording display 203 can be, for example, an LCD TFT display from a Casio VM-50.

The LEDs 211a and 211b indicate operational status of the recording unit. For example, one of the LEDs 211a and 211b (the "system status indicator") can be used to indicate system status information, such as whether the recording unit is powered or not and whether the recording unit is operating normally or malfunctioning in some manner. The other of the LEDs 211a and 211b (the "recording/transmission status indicator") can be used, for example, to indicate recording and transmission status.

The button 207 enables the recorder to start and stop recording, as well as to start and stop transmission of the recording to other recording units, using control options displayed on the control interface visual display 202.

The buttons 204a, 204b, 204c and 204d enable control of the display of a recording by the visual recording display 203. The button 204a causes display of a recording that moves forward in time, while the button 204b causes display of a recording that moves backward in time. The button 204c causes display of a recording to stop. The button 204d causes the display of a recording to skip in a predetermined manner in the temporal direction in which the recording was being displayed. Each of the buttons 204a, 204b, 204c and 204d can also be implemented so that depressing the button 204a, 204b, 204c or 204d in different manners causes different operation of the visual recording display 203. For example, the button 204d can be operated in different modes: one mode can cause the display of the recording to skip to the next mark, while other mode(s) can cause the display of the recording to skip by a specified amount of time.

The button 208 enables the recorder to review a part of a recording that has previously been recorded. Activation of the button 208 causes the control interface visual display 202 to display control options to the recorder that enable the recorder to specify the point at which to begin the display of previously recorded content. For example, the control interface display 200 can be implemented so that activation of the button 208 causes display of one or more parts of a recording corresponding to one or more marks that are selected by the recorder.

The button 210 enables the recorder to change the recording being displayed by the visual recording display 203 (e.g., to display a recording transmitted from another recording unit), using information and control options displayed on the control interface visual display 202.

The button 209 enables the recorder to check the operational status of components of the recording unit and to effect changes in operating parameters, using information and control options displayed on the control interface visual display 202.

Marking buttons 205a, 205b and 205c enable specification of different types of marks. For example, each button 205a, 205b and 205c can be dedicated to a particular type of mark. Alternatively, one or more of the marking buttons 205a, 205b and 205c can enable specification of multiple types of marks, each such button 205a, 205b and/or 205c causing display of control options by the control interface visual display 202 which allow selection of particular types of marks. (In general, such mark selection control options can be nested to any desired degree and can be implemented so that the recorder can select a mark from any level of the hierarchy.) Each of the buttons 205a, 205b and 205c has a unique shape, so that the recorder can operate a desired one of the buttons 205a, 205b and 205c with little or no visual observation of the buttons 205a, 205b and 205c, thus facilitating low attention recording.

The button 206 (a "kill switch") enables the recorder to immediately stop operation of a visual data acquisition device or the recording unit so that acquisition of recording data (and, if applicable, transmission of recording data), can be stopped without shutting down all power to the recording unit.

The color, shape, location (including grouping) and/or texture of buttons of the control interface device 200 can be specified to facilitate interaction by the recorder with the control interface device 200, thus facilitating low attention recording. For example, related buttons (e.g., the marking buttons 205a, 205b and 205c) can be made the same color, shape and/or texture, which can be a different color, shape and/or texture than any of the other buttons of the control interface device 200. The color, shape and/or texture of a button can also be specified so as to convey a sense of the function of the button, e.g., the button 206 can be made red (suggesting stopping).

Marks can be used to search, display and/or process recording data. Such searching, display and/or processing can take place during recording of an event (if the recording unit is adapted to enable such functionality) or after recording of an event (including after recording and marking data has been transferred to another device). To make maximum use of the flexibility in searching, displaying and/or processing a recording that is provided by marking the recording, the recording data is preferably stored on a non-linear data storage medium (such as a conventional hard disk or DVD disk) that enables immediate access to any of the recording data, rather than on a linear data storage medium, such as a tape.

In particular, marks can be used to effect display of a marked recording in a particular manner. In general, a mark enables an observer of a displayed recording to quickly move to recording content in the temporal vicinity of the marked part of the recording. (What can constitute "temporal vicinity" is discussed in more detail above.) Thus, marks can be used, for example, as a tool for enabling skimming of a recording, replay of a part or parts of a recording, or summarizing of a recording. Marks can be used to control display of a recording either automatically or under control of an observer of the recording. For example, all marked parts of a recording, or all parts of a recording marked by a mark having a particular meaning, can be displayed automatically. (Automatic display further necessitates that both the beginning and end of a marked part be identified in some manner, either explicitly or relative to a specified location in the recording, e.g., the location of a mark.) Similarly, during observation of a recording, an observer could (with appropriate adaptation of the display device, as can be understood by those skilled in the art) control a display device to fast-forward or skip to a part of a recording marked by any mark or a mark having particular meaning.

As discussed above with respect to non-contemporaneous marking (i.e., retrospective and predictive marking), in addition to specifying the time of a mark, a confidence level can be specified indicating the level of certainty that the time of the mark corresponds to the content that the recorder is seeking to mark. A specified confidence level can be used to affect the display of a corresponding marked part of the recording. For example, the magnitude of the confidence level can be used to determine a duration of time prior to the marked time at which to begin the display: as the confidence level decreases, the duration of time increases, thus increasing the likelihood of displaying the content of interest. Or, for example, if the mark specifies a particular time during the recording, the magnitude of the confidence level can be used to determine a duration of time, relative to the marked time, to display: as the confidence level increases, the duration of time decreases. Illustratively, a 50% confidence level might cause the display of a minute of a recording (centered about the time of the mark), a 75% confidence level might cause the display of 45 seconds of the recording, and a 100% confidence level might cause the display of 30 seconds of the recording. The durations of display can also be adjusted in accordance with the recency of a mark, e.g., as the duration of time between the marked time and the marking time increases, the duration of the display can increase a corresponding amount. The magnitude of the confidence level can also be used to affect the speed with which a recording is displayed. For example, the recording display speed can decrease as the confidence level increases. Further, the manner in which the recording is displayed based on the confidence level (as well as the magnitude of the range of times and/or the confidence level, as discussed above) can be made dependent upon the recency of the mark. Additionally, the recording unit can be implemented so that a confidence level is automatically associated with a mark based on the recency of the mark. For example, the confidence level can decrease with increase in the duration of time between the marked time and the marking time.

The use of marks to effect display of a recording entails use of the marks to search the recording data. Marks can also be used to enable searching of recording data without subsequent display. A recording can be searched to identify any marked part of a recording or only parts of a recording marked with a particular type of mark or marks. For example, it may be desirable to search recording data to identify particular marked parts of a recording and discard parts of the recording data that were not recorded within a predetermined duration of time from the time of the marks.

Though it is contemplated that it will be particularly useful for a recorder to be able to specify marks in a recording as the recording is being obtained, it can also be useful to provide a device that enables a recorder or other person (e.g., an observer of the recording display other than a recorder) to add marks (including defining new types of marks), modify existing marks (e.g., move the location (time) of a mark within the recording data, change the type of mark specified at a particular location within the recording data), or delete existing marks after the recording has been obtained (i.e., post-event). The temporal vicinity of a mark (e.g., the exact time in the recording at which the mark was specified, a time in the recording that is a predetermined amount of time before or after the time at which the mark was specified, or a predetermined duration of time relative to the time at which the mark was specified) can also be specified as part of post-event processing of the recording data. Nevertheless, it may be desirable to implement such capability so that it can be disabled by, for example, the recorder who obtained the recording. It may also be desirable to enable one or more people that add marks to prevent (either automatically or at the direction of the person adding the mark) deletion or modification of the marks that they add.

Various embodiments of the invention have been described. The descriptions are intended to be illustrative, not limitative. Thus, it will be apparent to one skilled in the art that certain modifications may be made to the invention as described herein without departing from the scope of the claims set out below. For example, the marking capabilities described herein can generally be implemented as part of any recording apparatus or method, or apparatus or method for processing recording data.

We claim:

1. A recording unit for recording an event, comprising:
   a data acquisition device for obtaining recording data representing the content of the event;
   a data storage device for storing data, wherein the stored data includes the recording data;
   a control interface device for enabling a user to control operation of the recording unit, the control interface device further comprising marking means for enabling the user to specify multiple types of non-contemporaneous marks;
   a system controller that causes, in response to the specification of a non-contemporaneous mark and a time value relative to the marking time of the non-contemporaneous mark specified by the user, the data storage device to store marking data associating the non-contemporaneous mark with the recording data obtained at a marked time relative to the marking time by the specified time value;
   wherein the marking data defines a confidence level that represents the certainty of the user that the marked time associated with the marked recording data is a time associated with the recording data that the user desires to mark and the confidence level is associated with the specified time value relative to the marking time.

2. The recording unit as in claim 1, wherein the marking means is adapted to enable specification of a retrospective mark that is associated with the recording data obtained at a marked time prior to the marking time at which the retrospective mark was specified by the user.

3. The recording unit as in claim 1, wherein the marking means is adapted to enable specification of a predictive mark that is associated with the recording data obtained at a marked time subsequent to the marking time at which the predictive mark was specified by the user.

4. The recording unit as in claim 1, wherein the marking data defines the marking time and a duration of time, the marked time being the time different from the marking time by the amount of the duration of time.

5. The recording unit as in claim 1, wherein the marking data defines the marked time directly.

6. The recording unit as in claim 1, wherein the value of the confidence level defines a range of time relative to the marked time.

7. The recording unit as in claim 1, wherein the marking data further defines a range of time relative to the marked time.

8. The recording unit as in claim 1, wherein the marking means further comprises:
   means for indicating that a voice mark is to be imminently specified; and
   means for identifying a voice mark, the means for identifying operable in response to an indication that a voice mark is to be imminently specified.

9. The recording unit as in claim 1, wherein the recording unit is portable.

10. The recording unit as in claim 9, further comprising means for mounting one or more components of the recording unit on the body of the user.

11. The recording unit as in claim 1, wherein the data acquisition device further comprises a visual data acquisition device.

12. The recording unit as in claim 11, wherein the data acquisition device further comprises an audio data acquisition device.

13. The recording unit as in claim 1, wherein the multiple types of marks include one or more marks indicating a level of importance or interest of the content which the marked recording data represents.

14. The recording unit as in claim 1, wherein the multiple types of marks include one or more marks indicating a characteristic of the content which the marked recording data represents.

15. The recording unit as in claim 1, wherein the multiple types of marks include one or more marks indicating the beginning or end of activity of interest.

16. The recording unit as in claim 1, wherein the multiple types of marks include one or more marks indicating the recording conditions.

17. The recording unit as in claim 1, wherein the multiple types of marks include one or more marks indicating the user's state of mind.

18. The recording unit as in claim 1, wherein the multiple types of marks include one or more privacy marks.

19. The recording unit as in claim 18, wherein the one or more privacy marks includes a mark that indicates that the marked part of the recording is to be erased.

20. The recording unit as in claim 1, wherein the multiple types of marks include one or more marks indicating different recording units.

21. The recording unit as in claim 1, wherein the multiple types of marks include one or more marks identifying the person making the mark.

22. The recording unit as in claim 1, wherein the multiple types of marks include one or more marks identifying a person appearing in the part of the recording represented by the recording data associated with the mark.

23. The recording unit as in claim 1, further comprising:
   means for analyzing the recording data; and
   means for changing the meaning of a mark based on the analysis of the recording data.

24. The recording unit as in claim 1, further comprising means for obtaining data other than the recording data; and
   means for changing the meaning of one or more marks based on the data other than the recording data.

25. The recording unit as in claim 1, further comprising one or more marking tokens for enabling a person to specify a corresponding type of mark, each marking token adapted to enable physical separation of the marking token from the control interface device.

26. The recording unit as in claim 1, wherein the system controller causes, in response to the specification of a mark by the user, operation of the recording unit in a predetermined manner in accordance with the type of the mark.

27. The recording unit for recording an event as recited in claim 1, wherein at least one mark indicates a level of importance or interest of the content which the marked recording data represents.

28. The recording unit as in claim 27, wherein:
   at least one mark indicates a level of importance or interest of the content which the marked recording data represents; and
   the system controller causes the recording data corresponding to the at least one mark to be compressed in accordance with the level of importance or interest represented by the mark.

29. The recording unit as in claim 28, wherein the system controller causes compression of the recording data to be reduced after a predetermined amount of time.

30. The recording unit as in claim 1 wherein a data acquisition device for obtaining the recording data representing the content of the event;
   the means for producing a mark further comprises means for producing a mark and/or supplementing or modifying an existing mark based on the value of, or an analysis of, data acquired by the recording unit; and
   wherein:
   the recording unit further comprises means for acquiring non-visual, human perceptible data other than the recording data; and
   the means for producing a mark and/or supplementing or modifying an existing mark produces, supplements or modifies based on the value of, or an analysis of, the non-visual, human perceptible data other than the recording data.

31. The recording unit as in claim 30, wherein:
   the means for acquiring data other than the recording data further comprises a physiological monitoring device; and
   the means for producing a mark and/or supplementing or modifying an existing mark produces, supplements or modifies based on the value of, or an analysis of, physiological monitoring data.

32. The recording unit as in claim 30, wherein:
   the means for acquiring data other than the recording data further comprises a position sensing device; and
   the means for producing a mark and/or supplementing or modifying an existing mark produces, supplements or modifies based on the value of, or an analysis of, position data.

33. The recording unit as in claim 30, wherein the means for producing a mark and/or supplementing or modifying an existing mark produces, supplements or modifies based on the proximity of the marking time to the marked time.

34. For use in a recording unit being used by a user to record an event, a method for non-contemporaneously marking recording data obtained by the recording unit, comprising the steps of:

identifying a specification of a non-contemporaneous mark of a specified type and a specified time value relative to the marking time of the non-contemporaneous mark; and in response to an identification of the specification of a non-contemporaneous mark, storing marking data associating the non-contemporaneous mark with recording data obtained at a marked time relative to the marking time by the specified time value;

wherein the marking data defines a confidence level that represents the certainty of the user that the marked time associated with the marked recording data is a time associated with the recording data that the user desires to mark, and the confidence level is associated with the specified time value relative to the marking time.

35. A method as in claim 34, wherein:

the step of identifying further comprises identifying the specification of a retrospective mark; and the step of storing further comprises storing marking data associating the retrospective mark with the recording data obtained at a marked time prior to the marking time at which the non-contemporaneous mark was specified.

36. A method as in claim 34, wherein:

the step of identifying further comprises identifying the specification of a predictive mark; and the step of storing further comprises storing marking data associating the predictive mark with the recording data obtained at a marked time subsequent to the marking time at which the non-contemporaneous mark was specified.

37. A method as in claim 34, wherein the marking data defines the marking time and a duration of time, the marked time being the time different from the marking time by the amount of the duration of time.

38. A method as in claim 34, wherein the marking data defines the marked time directly.

39. A method as in claim 34, wherein the value of the confidence level defines a range of time relative to the marked time.

40. A method as in claim 34, wherein the marking data further defines a range of time relative to the marked time.

41. A method as in claim 34, wherein the step of identifying further comprises:

identifying an indication that a voice mark is to be imminently specified; and identifying a voice mark in response to an indication that a voice mark is to be imminently specified.

* * * * *

UNITED STATES PATENT AND TRADEMARK OFFICE
CERTIFICATE OF CORRECTION

PATENT NO. : 7,194,186 B1 Page 1 of 1
APPLICATION NO. : 09/557081
DATED : March 20, 2007
INVENTOR(S) : Strub et al.

It is certified that error appears in the above-identified patent and that said Letters Patent is hereby corrected as shown below:

In column 2, line 38, delete "(e–g.," and insert -- (e.g., --, therefor.

In column 14, line 51, delete "RecoQnition:" and insert -- Recognition: --, therefor.

In column 14, line 51, delete "Theorv" and insert -- Theory --, therefor.

In column 16, line 27, after "fear)" insert -- . --.

Signed and Sealed this

Second Day of September, 2008

JON W. DUDAS
*Director of the United States Patent and Trademark Office*